UNITED STATES PATENT OFFICE.

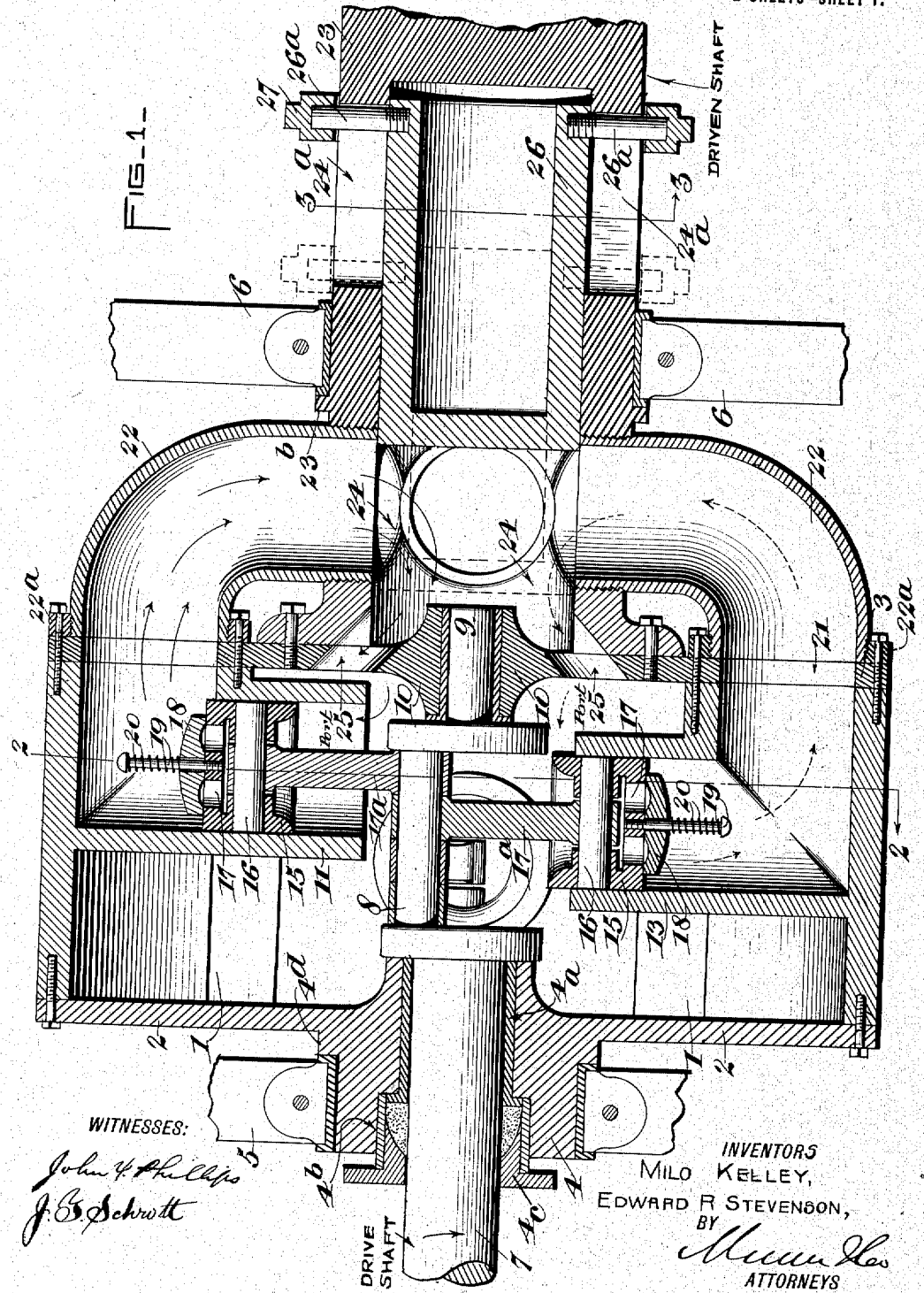

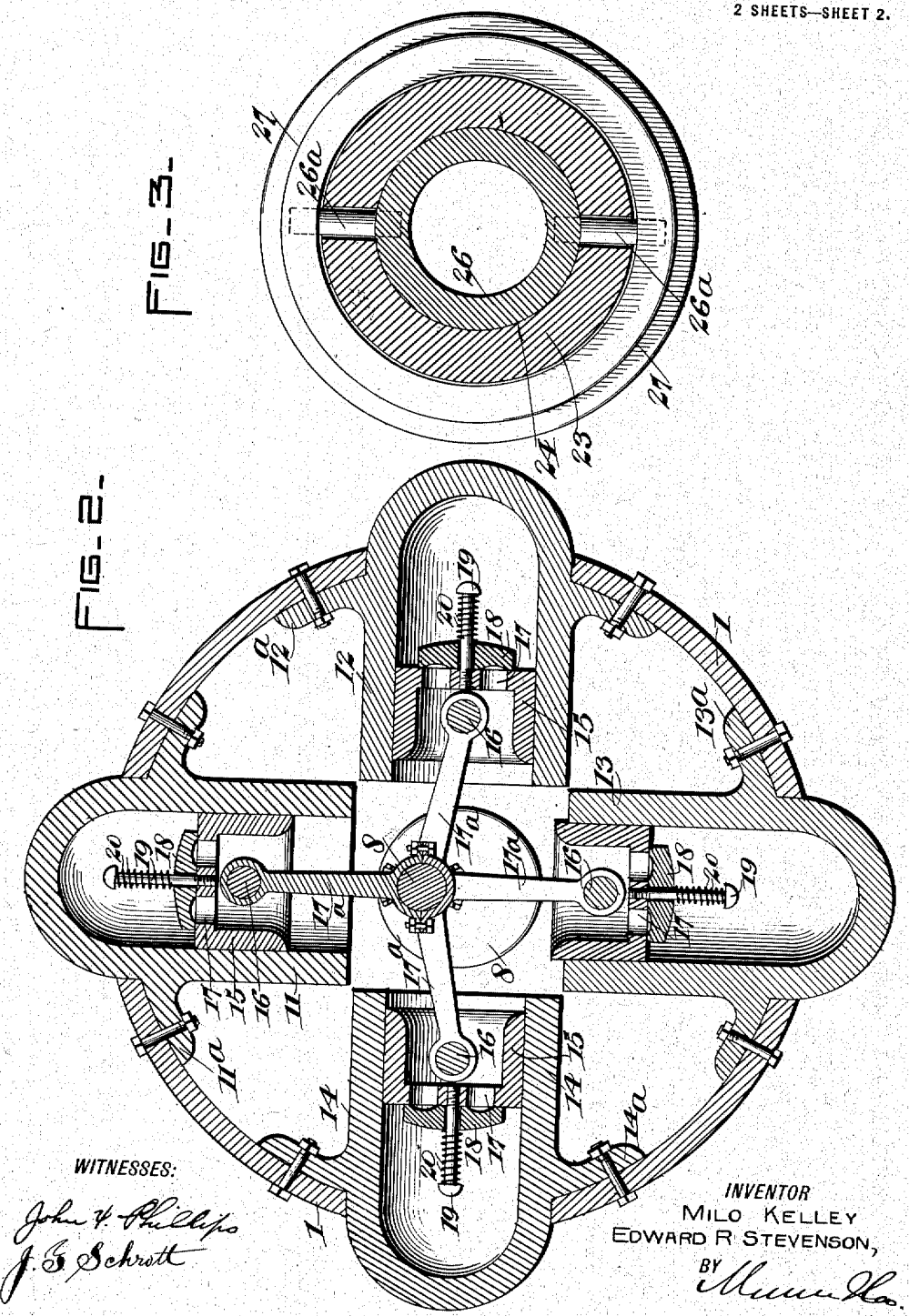

MILO KELLEY AND EDWARD RUSSELL STEVENSON, OF OAKLAND, OREGON.

POWER-TRANSMITTING MECHANISM.

1,254,809.

Specification of Letters Patent. Patented Jan. 29, 1918.

Application filed July 13, 1915. Serial No. 39,705.

*To all whom it may concern:*

Be it known that we, MILO KELLEY and EDWARD RUSSELL STEVENSON, citizens of the United States, residents of Oakland, in the county of Douglas and State of Oregon, have invented a new and useful Improvement in Power-Transmitting Mechanism, of which the following is a specification.

The principal object of our invention is to provide a novel device for transmitting power either at full speed or at any variation thereof which will be accomplished without the introduction of an elaborate system of gearing and thereby produce a mechanism of greater efficiency because of the elimination of the consequent friction occasioned by the use of gearing.

Another object is to provide a device for the transmission of maximum power at any variation from maximum to minimum speed, which is connectible between a two-part line shaft one side of which constitutes the engine shaft while the other side constitutes the power off-take or driven shaft the speed of which latter is regulatable by mechanism contained internally of the device.

Another object is to provide a fluid controlled power transmitting device which comprises a valved fluid passage through which the fluid is to be pumped by an arrangement of pumping pistons connected to the engine shaft. The valved passage in being opened and closed permits either a free or obstructed passage to the fluid which function in turn governs the rate of rotation of the transmitting casing in which the devices above, are housed.

Other objects and the application of our invention are hereinafter stated and described, specifically pointed out in the appended claims and illustrated in the accompanying drawings in which—

Figure 1 is a central vertical longitudinal section of our device, the valved fluid passage being open to present an unobstructed passage for the fluid at which time no movement will be imparted to the power off-take shaft, the direction of flow of the fluid being indicated.

Fig. 2 is a section taken substantially on line 2—2 on Fig. 1.

Fig. 3 is a section on the line 3—3 on Fig. 1.

By referring especially to Fig. 1 of the drawings, it will be seen that our device comprises essentially a circular casing 1 which is closed at its ends by heads 2 and 3 which are tightly bolted onto the casing 1 so as to make the joints fluid tight. The head 2 has an enlarged central bearing stud 4 which is rotatably mounted in one of a pair of fixed bearing standards 5 and 6. The bearing stud 4 is centrally apertured by bores of different diameters, the babbitted bore 4$^a$ of lesser diameter receiving the end of the drive shaft 7 and forming a bearing therefor, and the bore 4$^b$ of greater diameter receiving the stuffing gland 4$^c$ and packing nut, as shown.

The power shaft 7 which may be the shaft of an engine, extends within the casing 1 and has an integrally formed crank 8 and a trunnion 9 which rotates in the babbitted bearing 10 formed in the end cover plate 3 of the casing 1.

Disposed on the periphery of the casing 1 and at distances 90° apart, are cylinders 11, 12, 13 and 14 which are provided with suitable flanges 11$^a$, 12$^a$, 13$^a$, and 14$^a$ through which bolts are passed to fasten the respective cylinders to the wall of the casing 1.

The cylinders, just mentioned, are open at their bottom or inner ends so as to afford communication between the interior of the casing 1 and the cylinders and are provided with lateral branches of a diameter equal to that of the cylinders as shown in Fig. 1.

Mounted within the cylinders 11, 12, 13, and 14 so as to reciprocate therein, are pumping pistons 15, which are provided with wrist-pins 16 by means of which the pistons are connected to the crank 8 by a connecting rod 17$^a$ so as to be moved up and down, on their pumping strokes when the engine shaft 7 is rotated. The pistons 15 are apertured at the top as at 17 which apertures or ports are adapted to be closed when the pistons travel their pumping strokes by a valve 18 which moves on a central headed bearing pin 19 around which pin a spring 20 is coiled which bears against the top of the valve 18 and the head of the pin 19 so as to normally keep the valve 18 seated and the ports 17, closed.

Registering with the lateral branch openings of the cylinders 11, 12, 13, and 14 and formed in the end plate 3 as shown in Fig. 1, are openings 21 which in turn communicate with L connections 22. Bolted onto the end cover plate 3 of the casing 1, by means of an enlarged flange, is what may be termed, the power off-take shaft 23 which shaft 23 is bored at its end adjacent the cover plate 3 so as to produce a valve chamber 24 which valve chamber is in turn bored and tapped on its periphery to receive the ends of the L connections 22 so that communication is had between the tops of the cylinders 11, 12, 13 and 14 and the valve chamber 24. The L's 22 are screwed into suitable collars 22$^a$ by which means the L's are fixedly connected onto the cover 3 and held in register with the openings 21 before mentioned. The construction of the shaft 23 from where the valve chamber 24 is formed, is solid as indicated in Fig. 1 and may be provided with a suitable pulley or other means for utilizing the varied power thus converted by the device and in a manner hereinafter to be explained.

Formed in the cover 3 at a place midway of the openings 21 and the bearing 10, are diagonal ports 25 which offer communication between the interior of the casing 1 and the interior of the valve chamber 24.

Reciprocably mounted in the valve chamber 24 is a control valve 26 which at its rear end has stud pins 26$^a$ which project through elongated slots 24$^a$ in the valve chamber 24 and into the annular slot of a shifting ring 27 by which means the control valve 26 is adjusted to regulate the area of the valve chamber 24 so as to permit a greater or lesser flow of fluid therethrough as will also be hereinafter explained. The shaft 23 has suitable bearing in the fixed bearing standard 6 which shaft 23 has an annular rib 23$^b$ while the bearing stud 4 at the opposite side of the mechanism and adjacent the bearing standard 5 has an annular enlargement 4$^d$ by which arrangement endwise movement of the casing 1 is prevented and consequent stability and lack of vibration is maintained.

Operation.

The interior of the casing 1, chambers 11, 12, 13, and 14, connections 22 and valve chamber 24 is filled with a fluid which may be oil.

If the drive shaft 7, which may be the shaft of an engine, is rotated, the crank 8 will also revolve and reciprocate the pistons 15 in their respective chambers 11, 12, 13, and 14 and if the control valve 26 is back at its rear position, there will be nothing in the valve chamber 24 to obstruct the passage of the fluid which may flow through the L connections 22, valve chamber 24 ports 25 back into the casing 1, this circulation being caused by the reciprocating pistons 15 which act as pumping pistons. When one piston travels outwardly the ports 17 are closed by means of the valve 18 and the fluid is forced around in the direction of the arrows at the top in Fig. 1 while the ports 17 of the diametrically opposed piston will be open to admit the fluid into the space behind the retreating piston which fluid will be forced in the direction of the dotted arrows at the bottom of Fig. 1 when that piston travels its pumping stroke. The valve 18 on the bottom piston 15 has just closed since the piston is just about to return and force the fluid around as stated above.

As long as the control valve 26 remains in the position shown in Fig. 1, and the valve chamber 24 remains unobstructed, the free circulation of the fluid will be maintained and no movement of the driven shaft 23 will result. If, however, the control valve 26 is shifted to partly obstruct the fluid passage-way in the chamber 24, then greater resistance will be offered to the passage of the fluid through the L connections 22, chamber 24, and ports 25 with the result that the pistons in traveling their pumping strokes to force the fluid ahead will be exerting a pushing effect against a resilient fluid abutment which will effect a turning of the casing 1 and consequently the driven shaft 23 in a similar direction to that of the power shaft 7.

The farther the control valve 26 is moved inwardly and consequently the greater the passage way between the connections 22 and the chamber 24 becomes diminished, the less resilient and more resistant will the fluid abutment become and the greater will the speed of rotation of the casing 1 and driven shaft 23, be, since the pistons 15 cannot pump the fluid through the circulating passage ways fast enough to maintain the circulation and therefore the casing 1 must rotate, it being virtually pushed ahead by the advancing piston and the interposed yet semi-resisting fluid abutment.

Now when the valve 26 is moved in to close the chamber 24 and entirely obstruct the fluid passage-way, the pistons 15 in traveling outwardly on their pumping strokes will tend to compress the fluid ahead of them, which fluid being incompressible and also having no means of outlet, the path of circulation being obstructed by the control valve 26, now forms an unyielding abutment against which the piston will exert its pressure and being immovable will virtually shove the casing ahead of it and around and at the same speed of the drive shaft 7.

Thus it will be seen that the driven shaft 23 can be rotated from "0" speed to the full speed of the drive shaft 7 the intermediate series being gotten by the shifting of the control valve 26 so as to form a more or less resistant fluid abutment against which the pistons must exert power to maintain the circulation of the fluid.

By the foregoing description it will be apparent that the principal advantage gained by a power transmitting device such as this, is that all of the applied power except the negligible quantity which is consumed by the interior mechanism, is available at the driven shaft and thus the maximum power of the driving engine may be utilized at either a high or low speed.

We claim:—

1. In a fluid transmission, the combination of a drive and a driven shaft, a casing interposed between the shafts and connected with the driven shaft to rotate therewith, a crank disposed within the casing and rotatable with the drive shaft, cylinders arranged within the casing and in communication therewith at their inner ends, pistons operable within the cylinders and connected with the said crank and provided with outwardly opening valves, a valve chamber in communication with the outer ends of the cylinders, and with the central portion of the casing, and a valve for controlling the passageways in communication with the said valve chamber.

2. In a fluid transmission, the combination of longitudinally alined drive and driven shafts, a casing interposed between the shafts and journaled upon the drive shaft and connected with the driven shaft to rotate therewith, a crank within the casing and rotatable with the drive shaft, inner open ended cylinders disposed within the casing and rotatable therewith, pistons operable within the cylinders and connected with the said crank and provided with outwardly opening valves, a centrally disposed valve chamber rotatable with the casing and driven shaft and in communication with the outer ends of the cylinders and the central portion of the casing, and a single valve for controlling the passageways in communication with the valve chamber.

3. In a fluid transmission, the combination of longitudinally alined power and driven shafts, the driven shaft having a valve chamber in its inner end, a casing interposed between the shafts and journaled upon the power shaft, and rotatable with the driven shaft and in communication with the valve chamber thereof, a crank within the casing and rotatable with the power shaft, inner open ended cylinders arranged within the casing and rotatable therewith, pistons operable within the cylinders and connected with the said crank, and provided with outwardly opening valves, connecting means between the casing and valve chamber and formed with passageways, and a valve for controlling the said passageways.

4. In a fluid transmission, the combination of longitudinally alined power and driven shafts, the driven shaft having a valve chamber in its inner end, a casing interposed between the shafts and journaled upon the power shaft, and rotatable with the driven shaft and in communication with the valve chamber thereof, a crank within the casing and rotatable with the power shaft, inner open ended cylinders arranged within the casing and rotatable therewith, pistons operable within the cylinders and connected with the said crank, and provided with outwardly opening valves, hollow connections forming passageways between the outer ends of the cylinders and the valve chamber, a valve arranged within the valve chamber, and valve operating means mounted upon the driven shaft.

5. In a device of the character described, a fluid casing, a drive shaft projecting into an opening in the casing at one side, said shaft having a crank, a valve chamber secured to the fluid casing having peripheral openings and fluid circulating ports, said ports constantly communicating with the fluid casing, open bottomed cylinders in the fluid casing having lateral openings, a fluid passage-way between said lateral openings in the cylinders and peripheral openings in the valve chamber, a shiftable valve for diminishing the area of fluid inlet from the fluid passage-way to the valve chamber, and pistons in the cylinders and actuated by the drive shaft crank for maintaining a fluid circulation while the fluid passage-ways are open.

MILO KELLEY.
EDWARD RUSSELL STEVENSON.

Witnesses:
E. G. YOUNG, Jr.,
W. M. HINEY.